United States Patent
Sohns et al.

(10) Patent No.: US 11,416,371 B2
(45) Date of Patent: Aug. 16, 2022

(54) METHOD AND APPARATUS FOR EVALUATING AND SELECTING SIGNAL COMPARISON METRICS

(71) Applicant: Robert Bosch GmbH, Stuttgart (DE)

(72) Inventors: Joachim Sohns, Ludwigsburg (DE); Christoph Gladisch, Renningen (DE); Thomas Heinz, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 289 days.

(21) Appl. No.: 16/878,908

(22) Filed: May 20, 2020

(65) Prior Publication Data
US 2020/0409817 A1    Dec. 31, 2020

(30) Foreign Application Priority Data

Jun. 28, 2019    (DE) .......................... 102019209536.4

(51) Int. Cl.
| | |
|---|---|
| *G06F 11/34* | (2006.01) |
| *G06F 30/20* | (2020.01) |
| *G06F 30/15* | (2020.01) |
| *G06F 30/17* | (2020.01) |
| *G06F 30/3308* | (2020.01) |
| *G06F 119/02* | (2020.01) |

(52) U.S. Cl.
CPC .......... *G06F 11/3457* (2013.01); *G06F 30/15* (2020.01); *G06F 30/17* (2020.01); *G06F 30/20* (2020.01); *G06F 11/3447* (2013.01); *G06F 11/3466* (2013.01); *G06F 30/3308* (2020.01); *G06F 2119/02* (2020.01)

(58) Field of Classification Search
CPC ............. G06F 11/3457; G06F 11/3466; G06F 11/3447; G06F 30/20; G06F 30/3308; G06F 30/15; G06F 30/17; G06F 2119/02

USPC ....... 703/8, 6, 1, 20; 702/182; 716/136, 106, 716/111
See application file for complete search history.

(56) References Cited

U.S. PATENT DOCUMENTS

| | | | |
|---|---|---|---|
| 8,990,778 B1 | 3/2015 | Allocca et al. | |
| 2021/0124858 A1* | 4/2021 | Morgan | ................... G06F 30/20 |

FOREIGN PATENT DOCUMENTS

| | | | | |
|---|---|---|---|---|
| DE | 10303489 A1 | | 8/2004 | |
| FR | 2939924 A1 | * | 6/2010 | ........... G05B 23/024 |
| WO | WO-2020136859 A1 | * | 7/2020 | ........... G05B 23/024 |

OTHER PUBLICATIONS

Bringmann, et al.: "Model-based Testing of Automotive Systems", 2008 International Conference on Software Testing, Verification, and Validation, IEEE, Piscataway, NJ, USA, Apr. 9, 2008, pp. 485-493, XP031270179.

(Continued)

*Primary Examiner* — Phallaka Kik
(74) *Attorney, Agent, or Firm* — Norton Rose Fulbright US LLP; Gerard Messina

(57) ABSTRACT

A method for evaluating a simulation model. In the method, for selected test cases, a first performance index is calculated in the simulation model. For the same test case, a second performance index is ascertained in a real test environment. For each of the test cases, a difference is calculated between the first performance index and the second performance index, and a signal metric is determined. For each of the signal metrics, an interrelation between the difference and the respective signal metric is investigated. The signal metric that exhibits the closest interrelation with the difference is selected.

10 Claims, 6 Drawing Sheets

(56) References Cited

OTHER PUBLICATIONS

Ledin, Jim A.: "Hardware-in-the-Loop Simulation",Embedded Systems Programming, Feb. 1999, pp. 42-59, XP055737738.
SHOKRY and HINCHEY: "Model-Based Verification of Embedded Software", Computer, IEEE Computer Society, USA, 6 (4), (2009), pp. 53-59, XP011261540.

* cited by examiner

METHOD AND APPARATUS FOR EVALUATING AND SELECTING SIGNAL COMPARISON METRICS

CROSS REFERENCE

The present application claims the benefit under 35 U.S.C. § 119 of German Patent Application No. DE 102019209536.4 filed on Jun. 28, 2019, which is expressly incorporated herein by reference in its entirety.

FIELD

The present invention relates to a method for evaluating a simulation model. The present invention furthermore relates to a corresponding apparatus, to a corresponding computer program, and to a corresponding storage medium.

BACKGROUND INFORMATION

In software engineering, the use of models in order to automate testing activities and generate test artifacts in the testing process is referred to in general as "model-based testing" (MBT). The generation of test cases from models that describe the intended behavior of the system being tested is, for example, conventional.

Embedded systems, in particular, rely on coherent input signals of sensors, and in turn stimulate their environment by way of output signals to a wide variety of actuators. In the course of verification and preliminary development phases of such a system, a model (model in the loop, MiL), software (software in the loop, SiL), processor (processor in the loop, PiL), or overall hardware (hardware in the loop, HiL) of a control loop is therefore simulated in that loop together with a model of the environment. In automotive engineering, simulators in accordance with this principle for testing electronic control devices are in some cases referred to, depending on the test phase and test object, as component test stands, model test stands, or integration test stands.

German Patent Application No. DE 10303489 A1 describes a method of this kind for testing software of a control unit of a vehicle, in which a controlled system controllable by the control unit is at least partly simulated by a test system by the fact that output signals are generated by the control unit and those output signals of the control unit are transferred to first hardware modules via a first connection and signals of second hardware modules are transferred as input signals to the control unit via a second connection, the output signals being furnished as first control values in the software and additionally being transferred via a communication interface to the test system in real time with reference to the controlled system.

Simulations of this kind are common in various technological sectors and are utilized, for example, in order to test embedded systems in power tools, in engine control devices for drive systems, steering systems, and braking systems, or even in autonomous vehicles, for suitability in their early development phases. The results of simulation models according to the existing art are nevertheless incorporated only to a limited extent in release decisions due to a lack of confidence in their reliability.

SUMMARY

The present invention provides a method for evaluating a simulation model; a corresponding apparatus; a corresponding computer program; and a corresponding memory medium.

The example embodiment according to the present invention is based on the recognition that the quality of simulation models is critical in terms of correct predictability of the test results achievable therewith. In the field of MBT, the sub-discipline of validation deals with the task of comparing real measurements with simulation results. A variety of metrics, quantitative indicators, or other comparators, which link signals to one another and will be referred to hereinafter collectively as "signal metrics" (SM), are used. Examples of such signal metrics are metrics that compare magnitude, phase shift, and correlations. Some signal metrics are defined by standards, e.g., ISO 18571.

In verification, typically a system under test (SUT) is investigated on the basis of a requirement, specification, or performance score (hereinafter referred to collectively as a "key performance index," KPI). Note that Boolean requirements or specifications can often be converted into quantitative measurements by using formalisms such as signal temporal logic (STL). A KPI can be evaluated on the basis of either a real physical embodiment or a simulation.

The difference between KPIs and signal metrics is depicted in FIG. 1. Here, the signal (S1) measured in a real test environment and the signal (S2) ascertained in the course of the simulation are similar. The relevant signal metric is therefore low, but the performance index (KPI) of the two signals is above a predefined threshold (10) that separates favorable (11) from unfavorable (12) index values. The performance index (KPI) is therefore to be evaluated in the present case as unfavorable (12). The absolute offset (labeled with the reference character 13) is attributable here to a failure not of the signal metric but of the performance index (KPI).

The explanations that follow are based on the features presented below.

A "signal metric" represents an indicator of the similarity between two signals, and typically compares a signal from a real experiment with a signal from simulation. The signature is SM: $S \times S \to \mathbb{R}$, where S refers to the basic set of possible signals.

A KPI is a metric that defines, in a manner that is understandable to humans and can be computationally evaluated, the quality of a system performance (represented by a signal): $KPI: S \to \mathbb{R}$.

A requirement for a signal s based on a threshold value t for a KPI (Req(s):=KPI(s)<t) defines whether a system behavior embodied by the signal is acceptable and thus enables a binary decision: Req: $S \to B$.

Signal metrics and KPIs thus have different signatures. Signal metrics and KPIs correspondingly process different contents. As depicted in FIG. 1, the signal metric between the real (S1) and simulated output signal (S2) can be low, but both signals (S1, S2) can fail the system requirement and can therefore have a low or negative KPI.

The example method in accordance with the present invention furthermore takes into account the circumstance that it is sometimes unclear which of the numerous signal metrics is to be used when validating a simulation model on the basis of measurements. This happens especially when the requirements or performance indicators of the overall target SUT for validation are not yet established. The method described tackles this problem, and helps with selection of the respective signal metric that is the most suitable on the basis of a specific KPI.

The distinction between a KPI and a requirement solves the problem that humans often cannot indicate an unequivocal threshold value. This is because in order to specify a threshold value it can be necessary to collect experimental experience and to find a suitable compromise. The separation between KPI and requirement makes it possible to displace the decision regarding an acceptable threshold value.

There are also cases in which a trivial relationship exists between a KPI and a signal metric. This is the case when the KPI contains a reference signal and is defined on the basis of a signal metric. In this case, utilization of the proposed method is only of limited utility, since the result is irrelevant.

In summary, an advantage of the example method according to the present invention is that it makes available a mathematically motivated criterion for selecting signal metrics.

Advantageous refinements of and improvements to the basic features of the present invention are possible as a result of the features described herein.

BRIEF DESCRIPTION OF THE DRAWINGS

Exemplifying embodiments of the present invention are explained in further detail below and are depicted in the figures.

DETAILED DESCRIPTION OF EXAMPLE EMBODIMENTS

Figure 1:
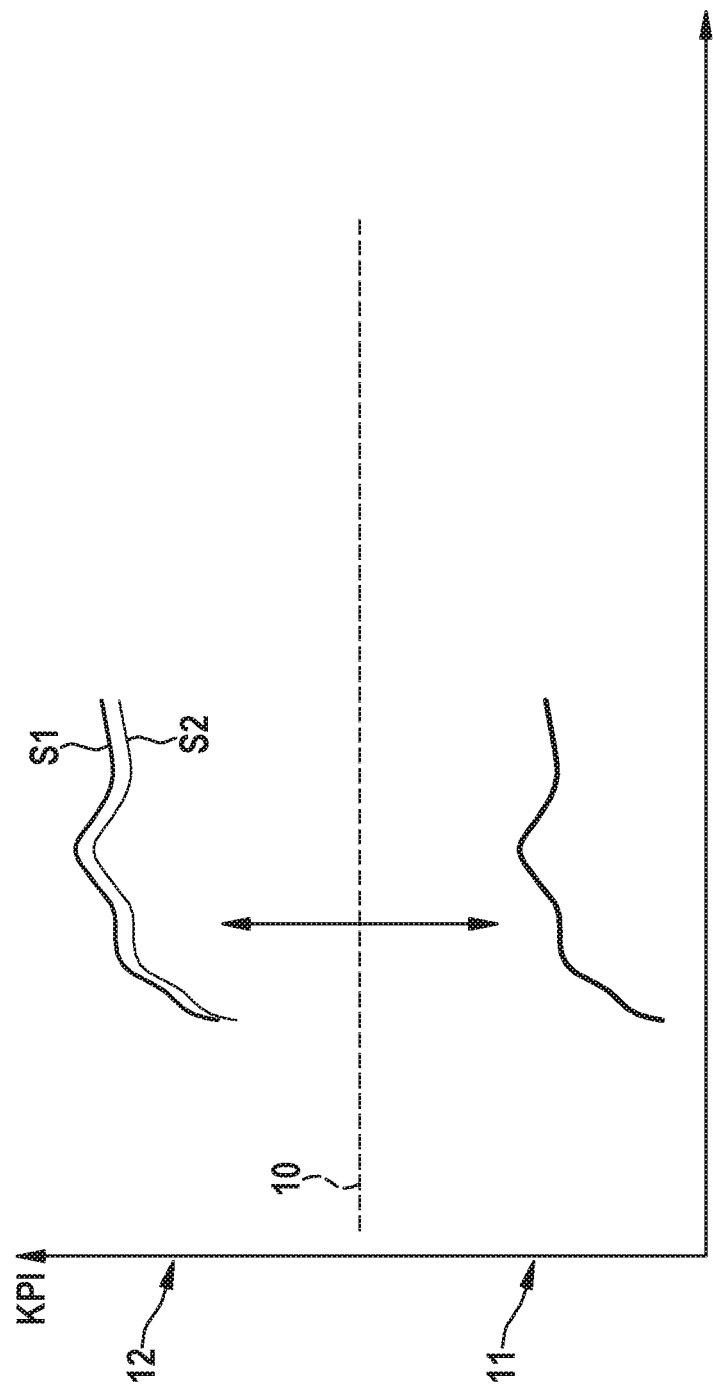
FIG. 1 is a visualization of the difference between a signal metric and a KPI.
Figure 2:
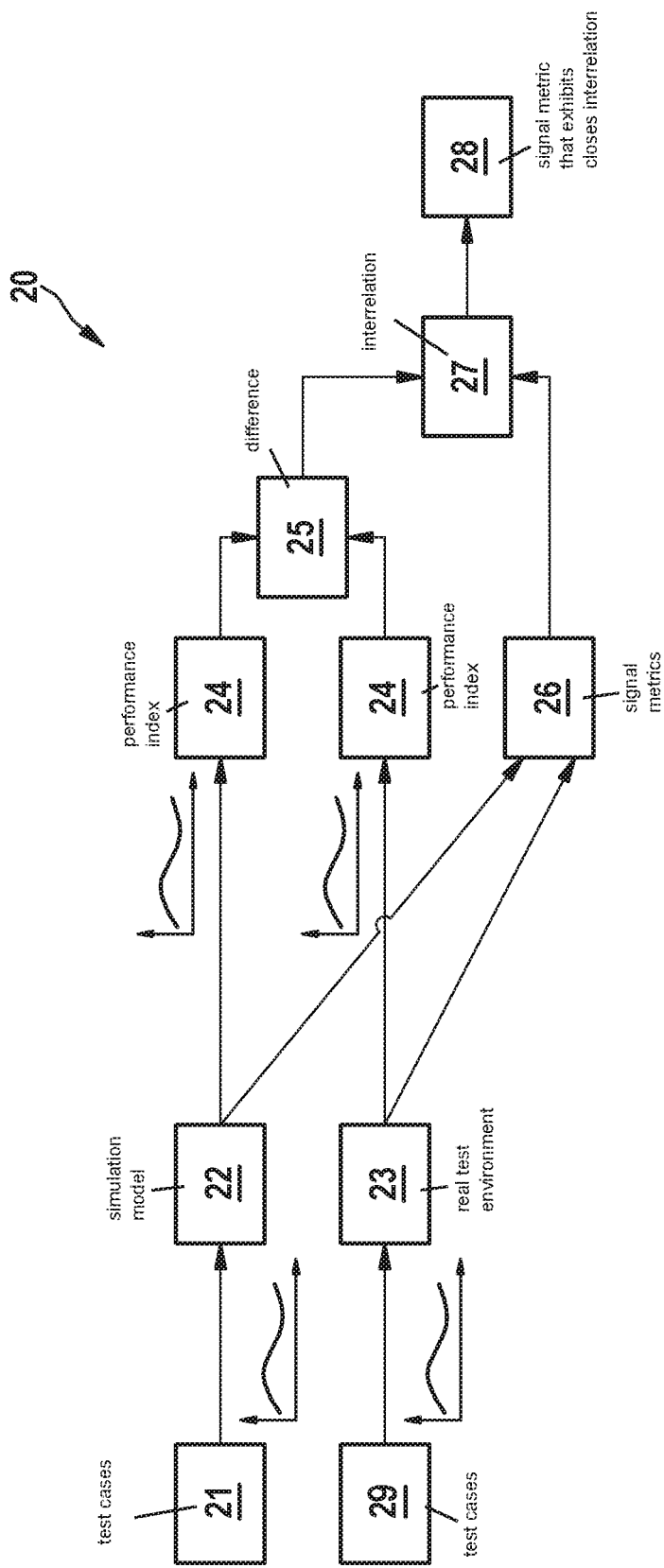
FIG. 2 is a data flow diagram of the method, which is representative of different algorithmic embodiments.

A calculation according to the present invention is illustrated by FIG. 2 and is based on the feature of calculating on the one hand varying values ΔKPI and on the other hand varying signal metrics (26) for selected test cases (21, 29), by varying the output signals from simulation (22) and from observation (23) of various real measurements. The approach according to the present invention further provides for calculation of the interrelation (27) between the values calculated for ΔKPI and the signal metrics. The signal metric that exhibits the closest interrelation with ΔKPI is selected (28). The ΔKPI values refer here to the difference (25) between the performance index (24) calculated in the simulation model (22) and, on the other hand, ascertained in the real test environment (23).

A variation of the simulation outputs is achieved by varying certain simulation parameters, e.g., input variables. The variation of the measurements can be achieved by repeating experiments or by way of multiple experiments under different conditions, for example using different parameters.

As already mentioned, a signal metric $SM_k$ maps two signals onto one real value (SM: $S \times S \to \mathbb{R}$); in contrast thereto, a KPI maps a signal, and optionally the original SUT inputs X, onto a real value (KPI: $S \to \mathbb{R}$). The functions SM and KPI thus possess different signatures, and the interrelation between ΔKPI (ΔKPI: $S \times S \to \mathbb{R}$) and SM is therefore calculated.

Figure 3:
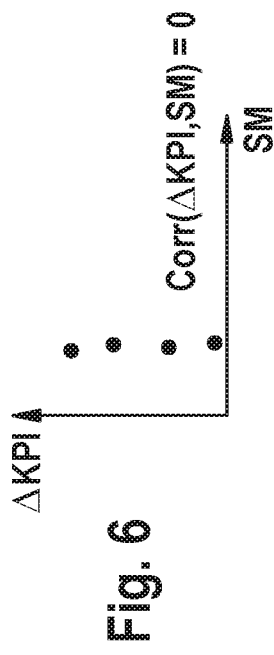
FIGS. 3 to 7 show instances with different relationships between ΔKPI and SM, and the resulting interrelation.
Figure 4:
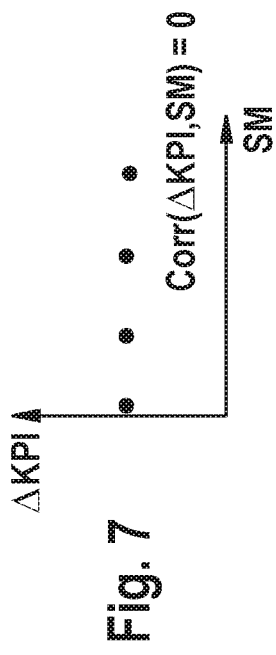
Figure 5:
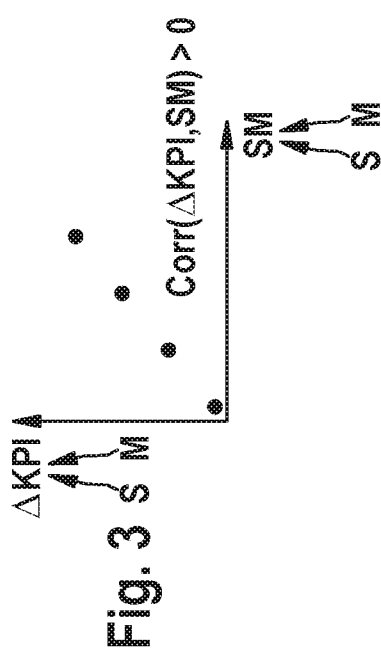
Figure 6:
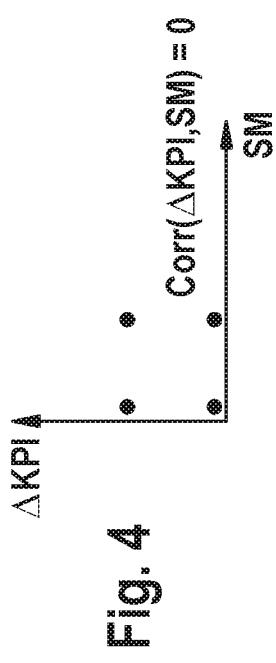
Figure 7:
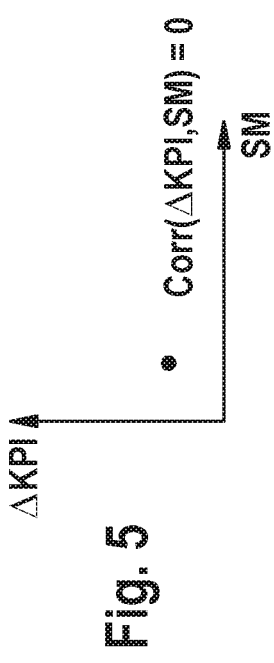
Figure 8:
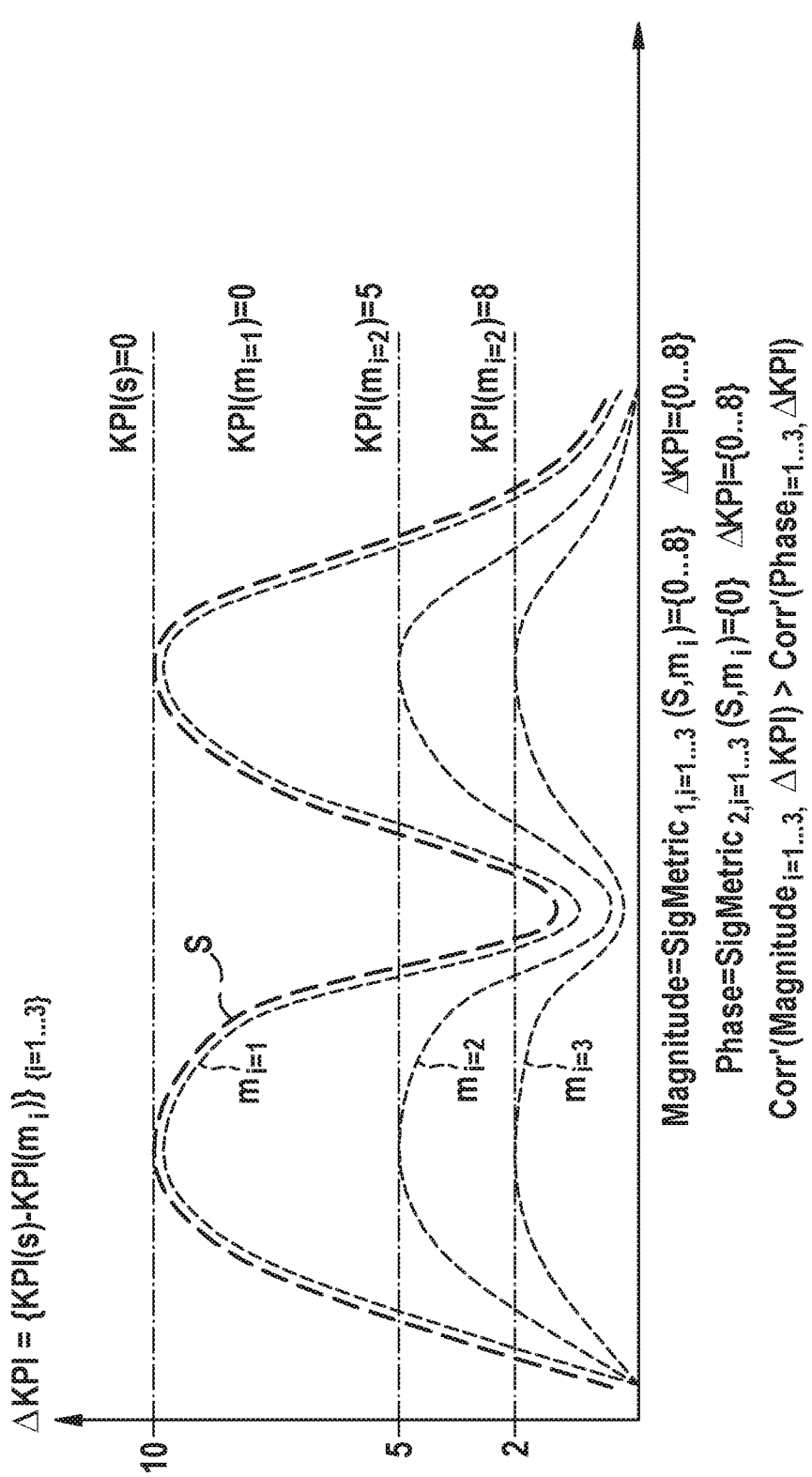
FIGS. 8 and 9 are exemplifying illustrations of the calculations of the method (FIG. 2) according to a possible embodiment, in which the simulated signal S is maintained and only the measured signals $m_i$ vary.
Figure 9:
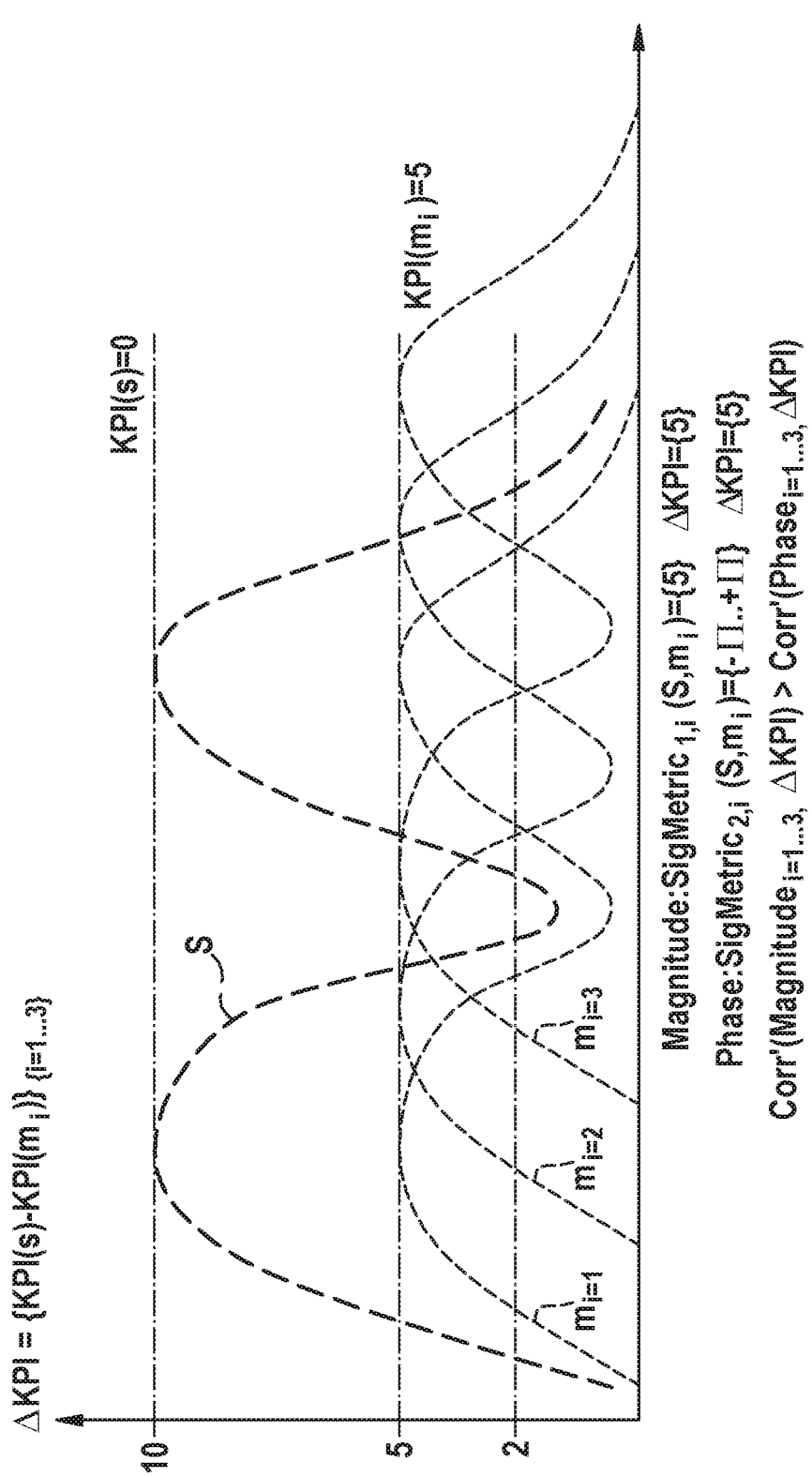

The usual definition of the correlation is unsuitable, however, since it is possible (unlike in the ideal case depicted in FIG. 3) for ΔKPI or SM to be constant despite different simulation signals and different measurements. In that case the variance Var(ΔKPI) or Var(SM) is equal to zero, so that a corresponding correlation coefficient is undefined. In consideration of such cases, as depicted in FIGS. 4 to 7, and of numerical instabilities, a modified correlation proves to be useful:

$$\text{Corr}'(A, B) := \begin{cases} \text{Corr}(A, B), & \text{Var}(\Delta KPI) \neq 0 \wedge \text{Var}(SM) \neq 0 \quad \text{(Equation 1)} \\ 1, & \text{Var}(\Delta KPI) = \text{Var}(SM) = 0 \\ 0, & \text{Var}(\Delta KPI) = 0 \oplus \text{Var}(SM) = 0 \end{cases}$$

where ⊕ is the exclusive-OR operator.

Be it noted that Equation 1 can also use other functions, for example the covariance, with the modifications described.

Figure 10:
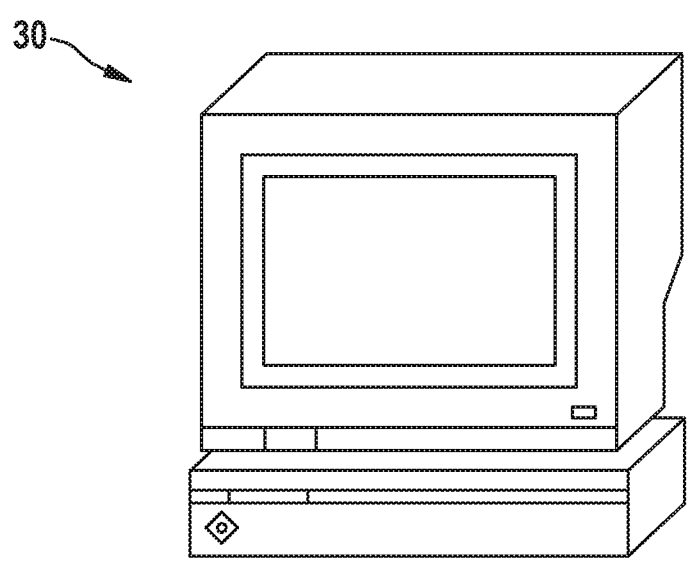
FIG. 10 schematically shows a workstation according to a second embodiment of the invention.

This method (20) can be implemented, for example, in software or hardware or in a mixed form of software and hardware, for example in a control device as indicated by the schematic depiction of FIG. 10.

Example embodiments of the present invention are further described in the following paragraphs.

Paragraph 1. A method (20) for evaluating a simulation model (22) in particular of an at least semiautonomous robot or vehicle, characterized by the following features:
  for selected test cases (21), a first performance index (24) is calculated in the simulation model (22);
  for the same test cases (21), a second performance index (24) is ascertained in a real test environment (23);
  for each of the test cases (21), a difference (25) is calculated between the first performance index (24) and the second performance index (24), and a signal metric (26) is determined;
  for each of the signal metrics (26), an interrelation (27) between the difference (25) and the respective signal metric (26) is investigated; and
  the signal metric (26) that exhibits the closest interrelation (27) with the difference (25) is selected (28).

Paragraph 2. The method (20) as recited in Paragraph 1, wherein the signal metrics (26) relate to at least one of the following:
  a signal strength;
  a phase shift; or
  a correlation.

Paragraph 3. The method (20) as recited in Paragraph 1 or 2, wherein the test cases (21) are selected using one of the following methods:
  a random method;
  an uncertainty quantification; or
  a search-based test method.

Paragraph 4. The method (20) as recited in one of Paragraphs 1 to 3, characterized by the following feature:
  the first performance index (24) is varied by the fact that parameters of the simulation model (22) are modified.

Paragraph 5. The method (20) as recited in one of Paragraphs 1 to 4, characterized by the following feature:
  the second performance index (24) is varied by the fact that the test cases (21) are repeated.

Paragraph 6. The method (20) as recited in one of Paragraphs 1 to 5, characterized by the following features:
  if both the difference (25) and the signal metric (26) are constant, the interrelation (27) is defined as one;

otherwise, if the difference (25) or the signal metric (26) is constant, the interrelation (27) is defined as zero; and otherwise the interrelation (27) is defined by a relationship indicator of the difference (25) and the signal metric (26).

Paragraph 7. The method (20) as recited in Paragraph 6, characterized by the following feature:

the relationship indicator is a correlation coefficient.

Paragraph 8. The method (20) as recited in one of Paragraphs 1 to 7, wherein depending on the signal metric (26) selected, an automatic correction of errors, recognized based on the signal metric (26), of a system modeled by the simulation model (22), is effected.

Paragraph 9. A computer program that is configured to execute the method (20) as recited in one of Paragraphs 1 to 8.

Paragraph 10. A machine-readable storage medium on which the computer program as recited in Paragraph 9 is stored.

Paragraph 11. An apparatus that is configured to execute the method (20) as recited in one of Paragraphs 1 to 8.

What is claimed is:

1. A method for evaluating a simulation model in an at least semiautonomous robot or vehicle, the method comprising the following steps:

calculating in the simulation model, for each of selected test cases, a respective first performance index;

ascertaining in a real test environment, for each of the same selected test cases, a respective second performance index;

for each of the selected test cases, calculating a respective difference between the respective first performance index and the respective second performance index and determining a respective signal metric;

for each of the respective signal metrics, determining a respective interrelation between the respective difference and the respective signal metric; and selecting the respective metric that exhibits a closest interrelation with the respective difference.

2. The method as recited in claim 1, wherein the signal metrics relate to at least one of the following:

a signal strength; and/or a phase shift; and/or a correlation.

3. The method as recited in claim 1, wherein the test cases are selected using one of the following methods:

a random method; or an uncertainty quantification; or a search-based test method.

4. The method as recited in claim 1, further comprising the following step:

varying the first performance index by modifying parameters of the simulation model.

5. The method as recited in claim 1, further comprising the following step:

varying the second performance index by repeated the test cases.

6. The method as recited in claim 1, wherein:

for each of the test cases:

if both the respective difference and the respective signal metric are constant, the respective interrelation is defined as one;

otherwise if the difference or the signal metric is constant, the respective interrelation is defined as zero; and otherwise, the respective interrelation is defined by a relationship indicator of the respective difference and the respective signal metric.

7. The method as recited in claim 6, wherein the relationship indicator is a correlation coefficient.

8. The method s recited in claim 1, wherein, depending on the signal metric selected, an automatic correction of errors, recognized based on the signal metric, of a system modeled by the simulation model, is effected.

9. A non-transitory machine-readable storage medium on which is stored a computer program for evaluating a simulation model in an at least semiautonomous robot or vehicle, the computer program, when executed by a computer, causing the computer to perform the following steps:

calculating in the simulation model, for each of selected test cases, a respective first performance index;

ascertaining in a real test environment, for each of the same selected test cases, a respective second performance index;

for each of the selected test cases, calculating a respective difference between the respective first performance index and the respective second performance index and determining a respective signal metric;

for each of the respective signal metrics, determining a respective interrelation between the respective difference and the respective signal metric; and selecting the respective metric that exhibits a closest interrelation with the respective difference.

10. An apparatus configured to evaluate a simulation model in an at least semiautonomous robot or vehicle, the apparatus being configured to:

calculate in the simulation model, for each of selected test cases, a respective first performance index;

ascertain in a real test environment, for each of the same selected test cases, a respective second performance index;

for each of the selected test cases, calculate a respective difference between the respective first performance index and the respective second performance index and determine a respective signal metric;

for each of the respective signal metrics, determine a respective interrelation between the respective difference and the respective signal metric; and selecting the respective metric that exhibits a closest interrelation with the respective difference.

\* \* \* \* \*